United States Patent [19]
Won

[11] Patent Number: 5,600,382
[45] Date of Patent: Feb. 4, 1997

[54] INPUT/OUTPUT DEVICE FOR AUDIO/VIDEO SIGNALS ASSOCIATED WITH A TELEVISION

[75] Inventor: Tae Y. Won, Suwon, Rep. of Korea

[73] Assignee: Samsung Electronics Co., Ltd., Kyungki-do, Rep. of Korea

[21] Appl. No.: 348,886

[22] Filed: Nov. 28, 1994

[30] Foreign Application Priority Data

Nov. 27, 1993 [KR] Rep. of Korea ............... 93-25489

[51] Int. Cl.⁶ .................................. H04N 5/268
[52] U.S. Cl. .................................. 348/705; 348/722
[58] Field of Search ................... 348/705, 722, 348/725, 738, 706; 340/825.24, 825.25, 825.03; 381/123, 81; H04N 5/268, 5/640

[56] References Cited

U.S. PATENT DOCUMENTS

| | | | |
|---|---|---|---|
| 4,647,973 | 3/1987 | Deiss | 348/705 |
| 4,907,085 | 3/1990 | Bingham | 348/705 |
| 5,305,105 | 4/1994 | Heo | 348/705 |
| 5,486,877 | 1/1996 | Tanaka | 348/722 |

*Primary Examiner*—Victor R. Kostak
*Attorney, Agent, or Firm*—Sughrue, Mion, Zinn, Macpeak & Seas

[57] ABSTRACT

An input/output device of audio and video signals routed between a television and auxiliary audio/video appliance includes a switching circuit for switching audio and video signals input to or output from audio jacks and video jacks provided on a user accessible part of the television, and a controller providing a control signal for controlling the switching operation of the switching circuit. The input/output device may advantageously include a light emitting element for indicating the operative state of the switching circuit. The input/output device permits selective input to or output from the television of audio and video signals via a single set of jacks provided on the front of the television while permitting the user to easily confirm the operating state of the device.

10 Claims, 2 Drawing Sheets

FIG. 1A PRIOR ART
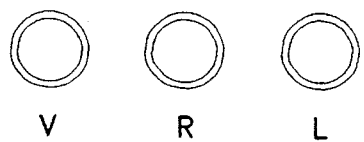
FIG. 1B PRIOR ART
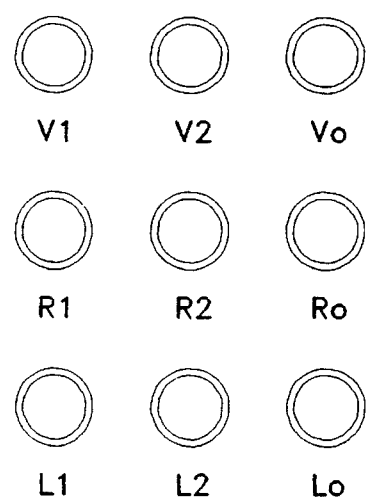
FIG. 3
| Level \ Terminal | a | d | g |
|---|---|---|---|
| Low | b | e | h |
| High | c | f | i |

INPUT/OUTPUT DEVICE FOR AUDIO/VIDEO SIGNALS ASSOCIATED WITH A TELEVISION

BACKGROUND OF THE INVENTION

1. Field of the Invention

The present invention relates to input/output devices for audio and video signals associated with a television. More particularly, the present invention relates to input/output devices for audio and video signals routed between a television and an auxiliary appliance generating or receiving the audio and video signals. According to one aspect of the invention, the television may selectively receive and output audio and video signals using a single set of jacks provided in a user-accessible portion of the television. The device advantageously may include a controller generating control signals for controlling reception or output of respective audio and video signals, and a switching device responsive to the control signals.

The instant application is based on Korean Patent Application No. 93-25489, which is incorporated herein by reference for all purposes.

2. Description of Related Art

Household televisions, especially televisions integrally formed for direct connection to audio and video signal processing appliances such as camcorders or video cassette recorders, include a plurality of jacks for input of audio and video signals from those appliances or for output of audio and video signals to those appliances. These jacks are normally round and are generally adapted to facilitate the connection with signal lines such as 75Ω or 300Ω coaxial cables.

The jacks used for input or output of audio and respective video signals are disposed differently according to make, model and manufacturer of the television. In many instances, jacks for audio and video signals are provided on several parts, e.g., respective front and rear portions, of the television.

It will be noted that only one video signal is used and, thus, only one type of video jack is provided. However, since the audio signals may be divided into left and right signals to accommodate, for example, stereo sound, the jacks associated with audio signals include left and right jacks.

FIG. 1A and FIG. 1B show the exemplary disposition of video and audio jacks used in a conventional television. As shown in FIG. 1A, the front of the television is provided with a jack V for input of a video signal as well as a jack R for input of a right audio signal and a jack L for input of a left audio signal.

As shown in FIG. 1B, the rear of the television is provided with jacks V1, R1 and L1 for input of first video and first audio signals from a first source, and jacks V2, R2 and L2 for input of second video and second audio signals from a second source. Furthermore, jacks V0, R0 and L0 are provided for output of video signals displayed on a monitor and respective audio signals corresponding to the video signal.

In short, the front of the television is provided with jacks just for input of audio and video signals while the rear of the television is provided with individual jacks for input of audio and video signals as well as jacks for output of audio and video signals. When such a television is used, connecting a device such as a camcorder or a video cassette recorder to provide audio and video signals to the television is easily accomplished, since the jacks for input of audio and video signals, which are provided on the front, can be used. When it is desired to output video signals displayed in the monitor and audio signals corresponding thereto, the task is more difficult since the jacks for output of audio and video signals are provided on the rear of the television. The large number of jacks makes the connection between the video components all the more difficult.

It will be noted that the larger the screen of the television is, the larger the overall size of the television becomes. Accordingly, when the user want to record signals provided by the television to an appliance such as a camcorder or a video cassette recorder, the size of television make access to a rear panel containing the output jacks extremely difficult.

The present invention was motivated by a desire to overcome these problems.

SUMMARY OF THE INVENTION

The principal object of the present invention is to provide an input/output device for audio and video signals of a television that can selectively input and output audio and video signals via a single set of jacks formed on the front of the television.

Yet another object of the present invention is to provide an input/output device for audio and video signals of a television that can selectively input and output audio and video signals via a single set of jacks which is simple to operate.

These and other objects, features and advantages according to the present invention are provided by and input/output device for input or output of audio and video signals of a television, which television can be used in conjunction with a general audio and video signal processing appliance, and which television has a plurality of jacks for selectively receiving and providing the audio and the video signals. The input/output device includes a switching device for switching between input and output of audio and video signals via jacks formed on a predetermined portion of the television, and control means for providing control signals to control the switching operation of said switching device.

According to one aspect of the invention, a light emitting device is provided for providing a visual indication as to whether the jacks are configured to receive or output audio and video signals.

BRIEF DESCRIPTION OF THE DRAWINGS

The preferred embodiments are described with reference to the drawings in which like elements are denoted by like or similar numbers and in which:

FIG. 1A illustrates shows the disposition of jacks provided in a front-side portion of a conventional television for input of audio and video signals;

FIG. 1B illustrates the disposition of jacks provided in a rear-side portion of the conventional television for input and output of audio and video signals;

FIG. 3 is a table illustrating connection of terminals of a switching circuit in accordance with the preferred embodiment of the present invention.

DETAILED DESCRIPTION OF THE PREFERRED EMBODIMENTS

Figure 2:
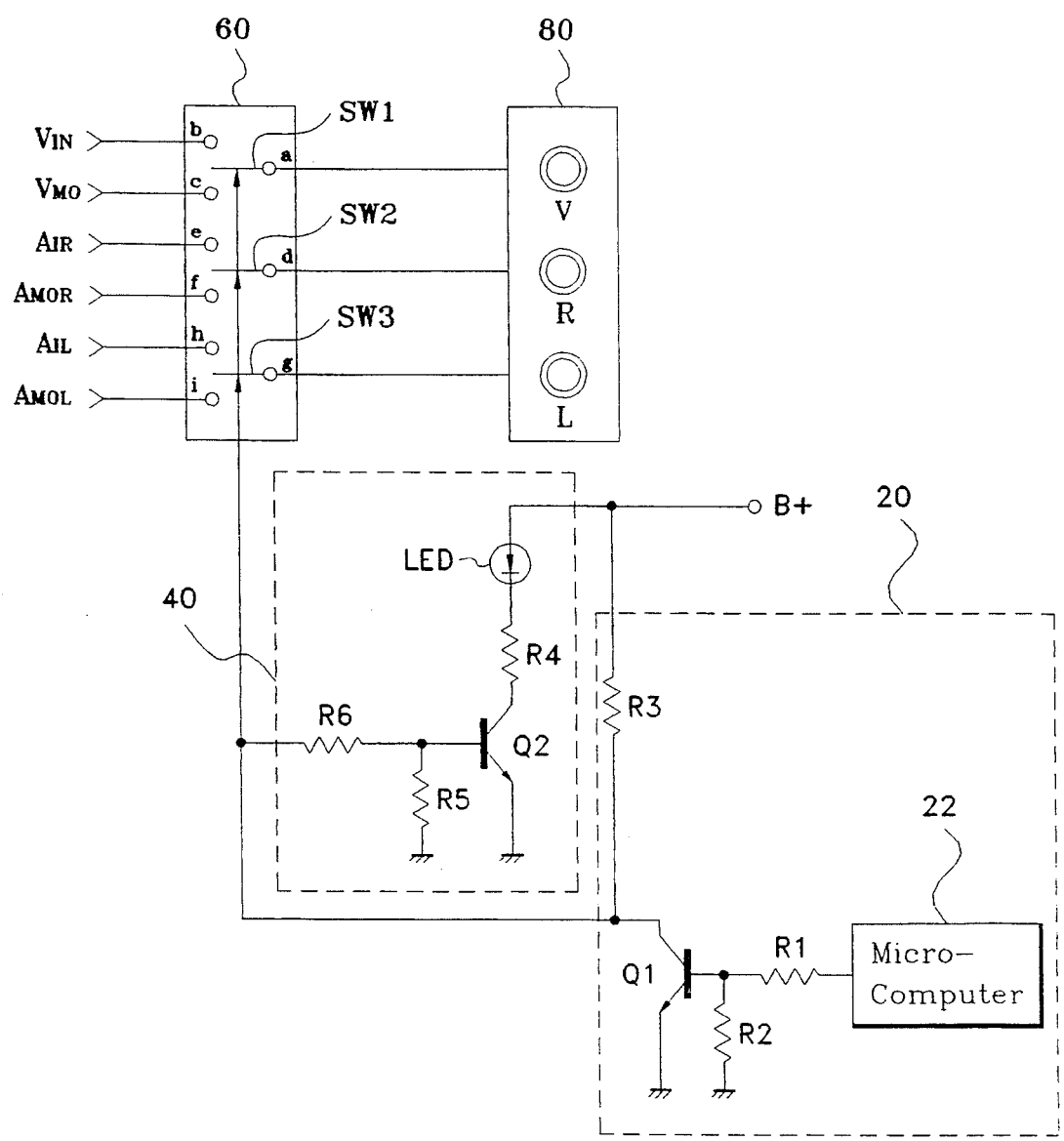
FIG. 2 is a circuit diagram of a preferred embodiment of an input/output device for audio and video signals for the television in accordance with the present invention.

As shown in FIG. 2, a controller 20 and a light emitting circuit 40 are connected in parallel between a common node N1, to which reference voltage B+ is applied, and a switching circuit 60.

Switching circuit 60 includes switches SW1, SW2 and SW3, which advantageously may be operated by a single control signal, as explained in greater detail below. Selection terminals b, e and h of switches SW1, SW2 and SW3, respectively, are connected to input lines for providing audio and video signals to the television. Selection terminals c, i and f are connected to output lines for video and corresponding signals provided by the television. Fixed terminals a, d and g are advantageously connected to an audio and video jack panel 80. Preferably, jack panel 80 includes a video signal jack V and respective left and right audio signal jacks L and R.

In controller 20, the base of a transistor Q1 is connected to an output of a microcomputer 22 via a resistor R1. A resistor R2 connects the base of transistor Q1 to ground, thus advantageously forming a voltage divider with resistor R1. The emitter of transistor Q1 is grounded while the collector of transistor Q1 is connected to the applied reference voltage B+ via node N1, resistor R3 and to the switching circuit 60.

In light emitting circuit 40, a light emitting diode LED and a resistor R4 are serially connected between the collector of transistor Q2 and node N1, to which is applied reference voltage B+. The emitter of transistor Q2 is grounded, while the base is connected to resistors R5 and R6. One end of resistor R5 is connected to ground. Resistor R6 connects a node N2 with the base of transistor Q2. It will be appreciated to node N2 is formed in the line connecting controller 20 with switching circuit 60. It will also be apparent that controller 20 and light emitting circuit 40 are connected in parallel between nodes N1 and N2. Preferably, resistor R6 cooperates with grounded resistor R5 to from a voltage divider.

As discussed above, the switching circuit 60 includes a switch SW1 for switching between a video input signal $V_{IN}$ and a monitor output signals $V_{MO}$. Circuit 60 advantageously includes a switch SW2 for switching between an audio input right signal $A_{IR}$ and a monitor output audio right signal $A_{MOR}$, as well as a switch SW3 for switching between an audio input left signal $A_{IL}$, and a monitor output audio left signal $A_{MOL}$. The operation of switches SW1, SW2 and SW3 of the switching circuit 60 is controlled in accordance with a voltage level of a control signal output from controller 20.

The controller 20 switches the reference voltage B+ applied to the switching circuit 60 to thereby control the signal switching operation of the switching circuit 60. A control signal having one of a high or low level preferably is produced by microcomputer 22, and is applied to the base of transistor Q1 after division by the voltage divider formed by resistors R1 and R2. It will be appreciated that transistor Q1 is turned ON or OFF in response to the level of the signal from microcomputer 22. When transistor Q1 is turned ON, the reference voltage B+ is connected to ground via the R3-Q1 path and the switching circuit 60 receives a low level voltage. The low level voltage positions switches SW1, SW2 and SW3 so that terminal a is connected to terminal b, and terminals d and g are connected to terminals e and h, respectively, as shown in FIG. 3. Accordingly, the video signals $V_{IN}$, audio right signals $A_{IR}$ and audio left signals $A_{IL}$, produced from a common audio video signal processing appliance (not shown) such as a camcorder or a video cassette recorder which may be connected to the jack panel 80, are input to the television (not shown) via the switching circuit 60.

When the transistor Q1 is turned off, the reference voltage B+ maintains a high level and is applied to the switching circuit 60. Advantageously, the switches SW1, SW2 and SW3 are positioned so as to connect the terminals a, d and g with terminals c, f and i, respectively. Thus, video signals which are displayed on a monitor of a television (not illustrated) and audio right and left signals corresponding thereto are produced and provided to the general audio and video signal processing appliance (not shown) via the switching circuit 60 and the jack panel 80.

Preferably, the light emitting circuit 40 emits light in accordance with the level of the voltage applied to the switching circuit 60, i.e., in accordance with the operating state of transistor Q1 in controller 20. In an exemplary case, when transistor Q1 in controller 20 is turned OFF, a high level voltage is applied to the switching circuit 60. It will be appreciated that this high level voltage is also applied to the base of transistor Q2 via the voltage divider consisting of resistors R5 and R6, thus turning transistor Q2 ON. It will be appreciated that when transistor Q2 is turned ON, the light emitting diode LED emits light.

When transistor Q2 of controller 20 is turned ON, a low level voltage is applied to both switching circuit 60 and to the base of the transistor Q2 via resistors R5 and R6. The divided low level voltage reaching transistor Q2 allows the transistor to turn OFF. When transistor Q2 is turned OFF, the light emitting diode LED is also OFF.

Advantageously, the light emitting diode LED emits lights when the video signal $V_{MO}$ displayed on the monitor and the audio signals $A_{MOR}$ and $A_{MOL}$ corresponding to the video signal are produced and connected via switching circuit 60 to jack panel 80. In contrast, the light emitting diode LED does not emit light when the video signal $V_{IN}$, audio left signal $A_{IL}$ and audio right signal $A_{IR}$ are input from the common audio and video signal processing appliance via the audio and video jack panel 80. Accordingly, the user may easily determine whether the audio and video signals are input to the television, or monitor video and audio signals are output from the television, by observing the light emitting circuit 40.

While this invention has been described in connection with what is presently considered to be the most practical and preferred embodiments, it is to be understood that the invention is not limited to the disclosed embodiments, but, on the contrary, it is intended to cover various modifications and equivalent arrangements included within the spirit and scope of the appended claims. For example, even through the light emitting circuit 40 is provided in parallel to the controller 20, as shown in FIG. 2, in order for the user to easily find the state of input or output, the present invention is not limited to this configuration. In an exemplary case, the emitter of the transistor Q1 can advantageously be connected with the light emitting diode LED so that the light emitting diode LED emits light, or does not emit light, in response to turning transistor Q1 ON and OFF.

The audio and video jack panel 80 (shown in FIG. 2) is provided in place of the conventional input-only jacks on the front of the television. Since the audio and video signals may be input or output via the jack panel 80 on the front-side portion of the television, when the user uses the general audio and video signal processing appliances, i.e., connects it to the television, the input/output of the audio and video signals can be carried out by means of the jacks on the front-side portion. The larger the television is, the more effective and advantageous the present invention becomes, since the user no longer requires access to the rear side of the television. It will also be appreciated that the plurality of the jacks for input of the audio and video signals and for output of the audio and video signals, which jacks are provided on the rear of the television, may be formed integrally or may be reduced in number. This configuration, as noted above, can be varied to meet the needs of the manufacturer.

It will also be appreciated that the jacks generally formed on the front-side portion of the television may be disposed in any location conveniently accessible by the user. When the jack panel is provided at a user-convenient location, the audio and video signals may advantageously be input or output through the jack panel. Thus, the present invention may significantly enhance the ease with which the user can connect the audio and video signal processing appliance to the television. Moreover, the light emitting circuit, which emits or does not emit light in response to the switching state of the switching circuit permits the user to easily confirm the present operating state of the switching device, i,e., receiving audio and video signals from, or providing audio signals to, the jack panel.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A device for selective input and output of audio and video signals between a television and a general audio and video signal processing appliance, comprising:

a plurality of jacks formed on a predetermined portion of the television providing input and output of respective audio and video signals;

first switching means operatively coupled to said jacks for switching between a first operating state wherein input audio and input video signals are applied from respective said jacks to the television and a second operating state wherein output audio and output video signals are provided by the television to respective said jacks; and control means generating a first control signal applied to said first switching means for selectively switching said first switching means between said first and said second operating states.

2. The device as set forth in claim 1, wherein said switching means switches between said first and said second operating states responsive to respective first and second voltage levels of said first control signal, and wherein said control means includes:

second switching means for varying said first control signal between said first and said second voltage levels responsive to selectively turning said second switching means ON and OFF; and a microcomputer providing a second control signal to thereby control said second switching means.

3. The device as set forth in claim 1, wherein said switching means switches between said first and said second operating states responsive to respective first and second voltage levels of said first control signal, and further comprising light emitting means for emitting light in accordance with a selected one of said first and said second voltage levels of said first control signal.

4. The device as set forth in claim 3, wherein said light emitting means includes:

a light emitting element; and third switching means for switching said element ON and OFF responsive to associated ones of said first and said second voltage levels of said first control signal.

5. The device as set forth in claim 1, wherein said switching means comprises a first switch, a second switch, and a third switch, each of said first, said second, and said third switches having a respective fixed terminal operatively connected to an associated one of said jacks, respective first and second selectable terminals, and a respective control terminal, wherein said first, said second and said third switches switch between respective said first and said second terminals responsive to said first control signal applied to respective said control terminals.

6. A device for selective input and output of audio and video signals between a television and a general audio and video signal processing appliance, comprising:

a plurality of jacks formed on a predetermined portion of the television providing input and output of respective audio and video signals;

a first switch, a second switch, and a third switch, each of said first, said second, and said third switches having a respective fixed terminal operatively connected to an associated one of said jacks, respective first and second selectable terminals, and a respective control terminal;

a controller generating a first control signal;

wherein said first, said second and said third switches are operable between a first operating state wherein input audio and input video signals are applied from respective said jacks to the television and a second operating state wherein output audio and output video signals are provided by the television to respective said jacks, and wherein said first, said second and said third switches switch between respective said first and said second terminals responsive to said first control signal applied to respective said control terminals to thereby selectively switch said first, said second and said third switches between said first and said second operating states.

7. The device as set forth in claim 6, wherein said first, said second and said third switches switch between said first and said second operating states responsive to respective first and second voltage levels of said first control signal, and wherein said controller includes:

a fourth switch for varying said first control signal between said first and said second voltage levels by selectively turning said fourth switch ON and OFF responsive to a second control signal; and a microcomputer providing said second control signal.

8. The device as set forth in claim 6, wherein said first, said second and said third switches switch between said first and said second operating states responsive to respective first and second voltage levels of said first control signal, further comprising a light emitting circuit for emitting light in accordance with a selected one of said first and said second voltage levels of said first control signal.

9. The device as set forth in claim 8, wherein said light emitting circuit includes:

a light emitting diode; and a fifth switch for switching said light emitting diode ON and OFF responsive to associated ones of said first and said second voltage levels of said first control signal.

10. An apparatus for routing audio and video signals between a television and a general audio and video signal processing appliance, said apparatus comprising:

a jack panel including a video jack conducting a video signal, a left audio jack conducting a left audio signal and a right audio jack conducting a right audio signal;

a switching device including a first switch, a second switch, and a third switch, each of said first, said second, and said third switches having a respective fixed terminal operatively connected to an associated one of said jacks, respective first and second selectable terminals, and a respective control terminal; and a controller generating a control signal;

wherein said first, said second and said third switches are operable between a first operating state wherein said audio and said video signals are conducted in a predetermined first direction and a second operating state wherein said audio and said video signals are conducted in a predetermined second direction opposite that of said first direction, wherein said first direction permits said audio and said video signals to be conducted via respective said first selectable terminals, respective said fixed terminals and respective said jacks, in that order, wherein said second direction permits said audio and said video signals to be conducted via respective said jacks, respective said fixed terminals, and respective said second selectable terminals, in that order, and wherein said first, said second and said third switches switch between respective said first and said second terminals responsive to said control signal applied to respective said control terminals to thereby selectively switch said first, said second and said third switches between said first and said second operating states.

* * * * *